(12) United States Patent
Manohararajah

(10) Patent No.: US 10,019,234 B2
(45) Date of Patent: Jul. 10, 2018

(54) METHODS AND APPARATUS FOR SEQUENCING MULTIPLY-ACCUMULATE OPERATIONS

(71) Applicant: Altera Corporation, San Jose, CA (US)

(72) Inventor: Valavan Manohararajah, Scarborough (CA)

(73) Assignee: Altera Corporation, San Jose, CA (US)

( * ) Notice: Subject to any disclaimer, the term of this patent is extended or adjusted under 35 U.S.C. 154(b) by 164 days.

(21) Appl. No.: 14/875,323

(22) Filed: Oct. 5, 2015

(65) Prior Publication Data

US 2017/0097810 A1    Apr. 6, 2017

(51) Int. Cl.
     *G06F 7/544*      (2006.01)

(52) U.S. Cl.
     CPC .... *G06F 7/5443* (2013.01); *G06F 2207/3868* (2013.01)

(58) Field of Classification Search
None
See application file for complete search history.

(56) References Cited

U.S. PATENT DOCUMENTS

| | | | |
|---|---|---|---|
| 4,554,629 A | 11/1985 | Smith | |
| 4,769,753 A | 9/1988 | Knudson et al. | |
| 5,040,137 A | 8/1991 | Sherrill | |
| 5,642,382 A | 6/1997 | Juan | |
| 5,835,488 A | 11/1998 | Sugita | |
| 6,247,036 B1 | 6/2001 | Landers et al. | |
| 6,937,650 B2 | 8/2005 | Coker et al. | |
| 7,068,713 B2 | 6/2006 | Iwasaki | |
| 2006/0230096 A1 | 10/2006 | Thendean et al. | |
| 2010/0192118 A1 | 9/2010 | Wendling et al. | |

OTHER PUBLICATIONS

Harris Semiconductor: "Digital Signal Processing Databook" In: "DSP Databook", Jan. 1, 1994 (Jan. 1, 1994), XP055341545, pp. 3-18.

*Primary Examiner* — Michael D. Yaary
(74) *Attorney, Agent, or Firm* — Patent Capital Group (57) ABSTRACT

An integrated circuit may have specialized processing blocks that are configurable to operate as arithmetic operators that may implement, amongst other functions, multiplication and multiply-accumulation operations in a first mode. In a second mode, a sequencer circuit may provide data signals and control signals to the specialized processing blocks such that the specialized processing block operates as a signal processing device that handles signals in a given sequence. For example, the sequencer circuit may control the signal arrival at the specialized processing block and the configuration of the configurable circuitry in the specialized processing block. In certain embodiments, the sequencer circuit and the specialized processing block may implement finite impulse response (FIR) filters.

20 Claims, 8 Drawing Sheets

METHODS AND APPARATUS FOR SEQUENCING MULTIPLY-ACCUMULATE OPERATIONS

BACKGROUND

The embodiments presented herein relate to integrated circuits and, more particularly, to sequencing arithmetic operations in an integrated circuit.

Considering a programmable logic device (PLD) as one example of an integrated circuit, as applications for which PLDs are used increase in complexity, it has become more common to design PLDs to include configurable specialized blocks in addition to blocks of generic programmable logic. Such specialized blocks may include circuitry that has been partly or fully hardwired to perform one or more specific tasks, such as a logical or a mathematical operation.

A specialized block may also contain one or more specialized structures. Examples of structures that are commonly implemented in such specialized blocks include multipliers, arithmetic logic units (ALUs), memory elements such as random-access memory (RAM) blocks, read-only memory (ROM) blocks, content-addressable memory (CAM) blocks and register files, AND/NAND/OR/NOR arrays, etc., or combinations thereof.

One particularly useful type of configurable specialized processing block that has been provided on programmable logic devices (PLDs) is a specialized processing block (SPB) that is often used in signal processing applications, which include the manipulation of data signals, audio signals, or video signals (as an example). Configurable specialized processing blocks may sometimes be referred to as multiply-accumulate (MAC) blocks, when they include structures to perform multiplication operations, summing operations, and/or accumulations of multiplication operations.

SUMMARY

In accordance with certain aspects of the invention, an arithmetic circuit may have an output, first, second, and third inputs and include a multiplier and configuration circuitry. The first input may be coupled to a sequencer circuit that provides a plurality of signals in a predetermined order, and the first input may receive a first signal of the plurality of signals from the sequencer circuit. The second and third inputs may receive second and third signals. The multiplier may have first and second multiplier input ports and a multiplier output port that is coupled to the output. The configuration circuitry may configure the arithmetic circuit to implement a first arithmetic function by routing the first and second signals to the first and second multiplier input ports in a first mode, and the configuration circuitry may configure the arithmetic circuit to implement a second arithmetic function by routing the second and third signals to the first and second multiplier input ports in a second mode.

It should be appreciated that the present invention can be implemented in numerous ways, such as a process, an apparatus, a system, a device, or a method on a computer readable medium. Several inventive embodiments of the present invention are described below.

In certain embodiments, the above-mentioned arithmetic circuit may further include an adder. The adder may have first and second adder input ports and an adder output port. The first adder input port may be coupled to the multiplier output port and the adder output port may be coupled to the output and to the second adder input port.

If desired, the arithmetic circuit may further include a register. The register may be coupled between the adder output port and the second adder input port such that the register and the adder collectively implement an accumulate function.

Further features of the present invention, its nature and various advantages, will be more apparent from the accompanying drawings and the following detailed description of the preferred embodiments.

DETAILED DESCRIPTION

The embodiments presented herein relate to integrated circuits and, more particularly, to sequencing arithmetic operations in an integrated circuit.

Configurable specialized processing blocks are often used to implement arithmetic operations in signal processing devices such as filters, samplers, analog-to-digital converters, digital-to-analog converters, signal compression engines, digital signal processors (DSPs), etc. In this context, configurable specialized processing blocks are often configured to support a pure arithmetic use model in which input signals are processed by arithmetic operators such as multipliers and adders or accumulators to implement an arithmetic function such as a multiply-accumulate function.

Many of the above-mentioned signal processing devices handle signals in a given sequence. For example, finite impulse response (FIR) filters, which are among the most common types of filters employed in digital signal processing, compute a current output signal as the weighted sum of the current input signal and a predetermined number of past input signals. It may therefore be desirable to pair a configurable specialized processing block with a sequencer circuit that controls the signal arrival at the configurable specialized processing block and the configuration of the configurable specialized processing block.

It will be recognized by one skilled in the art, that the present exemplary embodiments may be practiced without some or all of these specific details. In other instances, well-known operations have not been described in detail in order not to unnecessarily obscure the present embodiments.

Figure 1:
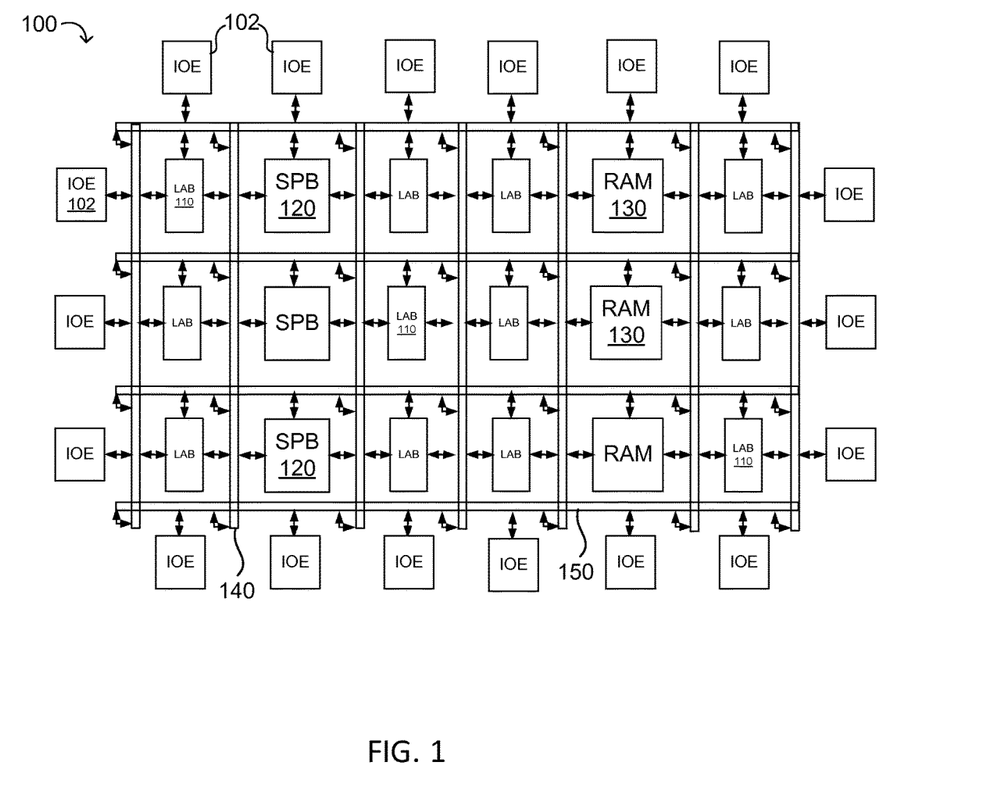
FIG. 1 is a diagram of an illustrative integrated circuit having specialized processing blocks in accordance with an embodiment.

An illustrative embodiment of an integrated circuit such as programmable logic device (PLD) 100 having an exemplary interconnect circuitry is shown in FIG. 1. As shown in FIG. 1, the programmable logic device (PLD) may include a two-dimensional array of functional blocks, including logic array blocks (LABs) 110 and other functional blocks, such as random access memory (RAM) blocks 130 and configurable specialized processing blocks such as specialized processing blocks (SPB) 120 that may include arithmetic operators and sequencer circuits, for example. Functional blocks such as LABs 110 may include smaller programmable regions (e.g., logic elements, configurable logic blocks, or adaptive logic modules) that receive input signals and perform custom functions on the input signals to produce output signals.

Programmable logic device 100 may contain programmable memory elements. Memory elements may be loaded with configuration data (also called programming data) using input/output elements (IOEs) 102. Once loaded, the memory elements each provide a corresponding static control signal that controls the operation of an associated functional block (e.g., LABs 110, SPB 120, RAM 130, or input/output elements 102).

In a typical scenario, the outputs of the loaded memory elements are applied to the gates of metal-oxide-semiconductor transistors in a functional block to turn certain transistors on or off and thereby configure the logic in the functional block including the routing paths. Programmable logic circuit elements that may be controlled in this way include parts of multiplexers (e.g., multiplexers used for forming routing paths in interconnect circuits), look-up tables, logic arrays, AND, OR, NAND, and NOR logic gates, pass gates, etc.

The memory elements may use any suitable volatile and/or non-volatile memory structures such as random-access-memory (RAM) cells, fuses, antifuses, programmable read-only-memory memory cells, mask-programmed and laser-programmed structures, mechanical memory devices (e.g., including localized mechanical resonators), mechanically operated RAM (MORAM), combinations of these structures, etc. Because the memory elements are loaded with configuration data during programming, the memory elements are sometimes referred to as configuration memory, configuration RAM (CRAM), configuration memory elements, or programmable memory elements.

In addition, the programmable logic device may have input/output elements (IOEs) 102 for driving signals off of PLD and for receiving signals from other devices. Input/output elements 102 may include parallel input/output circuitry, serial data transceiver circuitry, differential receiver and transmitter circuitry, or other circuitry used to connect one integrated circuit to another integrated circuit. As shown, input/output elements 102 may be located around the periphery of the chip. If desired, the programmable logic device may have input/output elements 102 arranged in different ways. For example, input/output elements 102 may form one or more columns of input/output elements that may be located anywhere on the programmable logic device (e.g., distributed evenly across the width of the PLD). If desired, input/output elements 102 may form one or more rows of input/output elements (e.g., distributed across the height of the PLD). Alternatively, input/output elements 102 may form islands of input/output elements that may be distributed over the surface of the PLD or clustered in selected areas.

The PLD may also include programmable interconnect circuitry in the form of vertical routing channels 140 (i.e., interconnects formed along a vertical axis of PLD 100) and horizontal routing channels 150 (i.e., interconnects formed along a horizontal axis of PLD 100), each routing channel including at least one track to route at least one wire. If desired, the interconnect circuitry may include double data rate interconnections and/or single data rate interconnections.

If desired, routing wires may be shorter than the entire length of the routing channel. A length L wire may span L functional blocks. For example, a length four wire may span four blocks. Length four wires in a horizontal routing channel may be referred to as "H4" wires, whereas length four wires in a vertical routing channel may be referred to as "V4" wires.

Different PLDs may have different functional blocks which connect to different numbers of routing channels. A three-sided routing architecture is depicted in FIG. 1 where input and output connections are present on three sides of each functional block to the routing channels. Other routing architectures are also intended to be included within the scope of the present invention. Examples of other routing architectures include 1-sided, 1½-sided, 2-sided, and 4-sided routing architectures.

In a direct drive routing architecture, each wire is driven at a single logical point by a driver. The driver may be associated with a multiplexer which selects a signal to drive on the wire. In the case of channels with a fixed number of wires along their length, a driver may be placed at each starting point of a wire.

Note that other routing topologies, besides the topology of the interconnect circuitry depicted in FIG. 1, are intended to be included within the scope of the present invention. For example, the routing topology may include diagonal wires, horizontal wires, and vertical wires along different parts of their extent as well as wires that are perpendicular to the device plane in the case of three dimensional integrated circuits, and the driver of a wire may be located at a different point than one end of a wire. The routing topology may include global wires that span substantially all of PLD 100, fractional global wires such as wires that span part of PLD 100, staggered wires of a particular length, smaller local wires, or any other suitable interconnection resource arrangement.

Furthermore, it should be understood that embodiments may be implemented in any integrated circuit. If desired, the functional blocks of such an integrated circuit may be arranged in more levels or layers in which multiple functional blocks are interconnected to form still larger blocks. Other device arrangements may use functional blocks that are not arranged in rows and columns.

Figure 2:
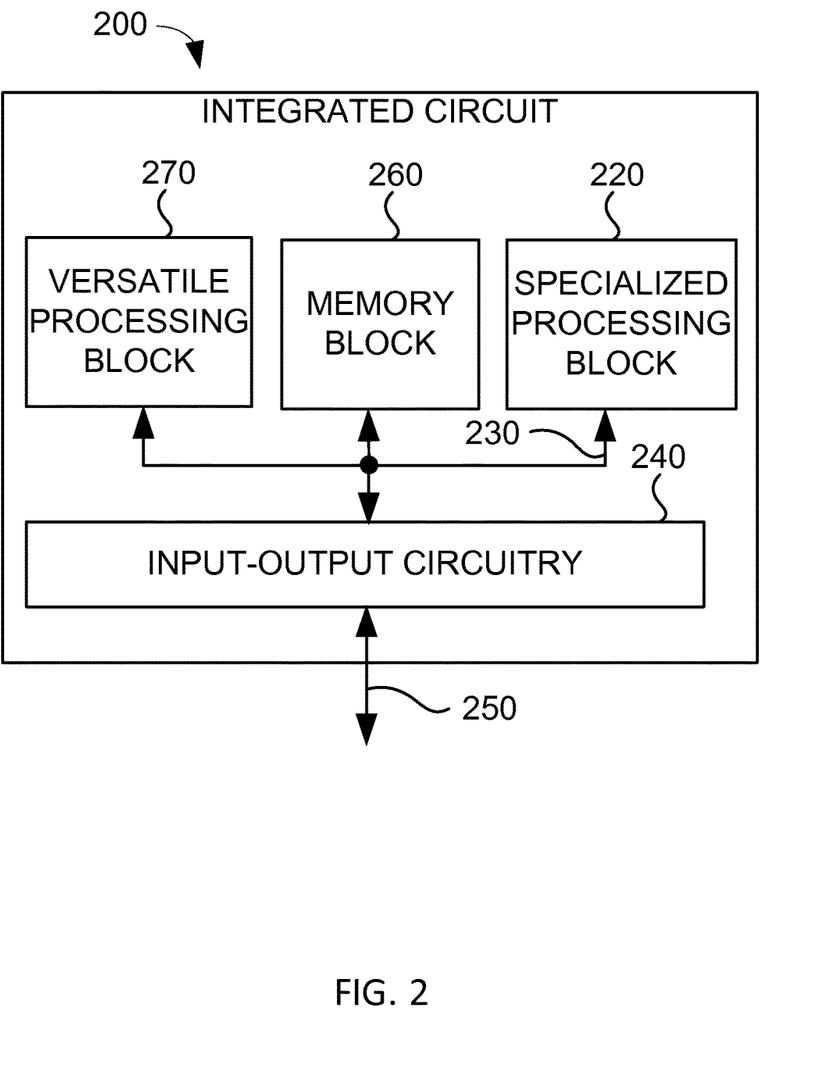
FIG. 2 is a diagram of an illustrative integrated circuit with storage, processing, and input-output circuitry in accordance with an embodiment.

FIG. 2 shows a block diagram of another embodiment of an integrated circuit 200 in accordance with the present invention. Integrated circuit 200 may include a memory block 260, a specialized processing block 220, a versatile processing block 270, and input/output circuitry 240.

Memory block 260 may include random-access memory (RAM), first-in first-out (FIFO) circuitry, stack or last-in first-out (LIFO) circuitry, read-only memory (ROM), registers, latches, or other storage circuitry suitable to store data. Input/output circuitry may include parallel input/output circuitry, differential input/output circuitry, serial data transceiver circuitry, or other input/output circuitry suitable to transmit and receive data.

Internal interconnection resources 230 such as conductive lines and busses may be used to send data from one component to another component or to broadcast data from one component to one or more other components. External interconnection resources 250 such as conductive lines and busses, optical interconnect infrastructure, or wired and wireless networks with optional intermediate switches may be used to communicate with other devices. In certain embodiments, the internal interconnect resources 230, and/or the external interconnect resources 250 may be implemented using configurable interconnect circuitry.

Versatile processing block 270 may include embedded microprocessors, microcontrollers, or other processing circuitry. Versatile processing block 270 may have combinational and sequential logic circuitry such as logical function blocks and storage elements such as registers. Versatile processing block 270 may be configurable or programmable to perform any arbitrary function. For example, versatile processing block 270 may be configured to perform any function including arithmetic functions and combinational functions. However, versatile processing block 270 may be much less efficient in executing a function than specialized processing block 220.

In comparison with versatile processing block 270, specialized processing block 220 may have limited functionality due to specialized processing components and limited configurability of interconnect resources. For example, in certain embodiments, specialized processing block 220 may include multipliers, adders, accumulators, shifters, and other arithmetic circuitry to facilitate the efficient implementation of arithmetic functions, but may not be configurable to implement combinational functions such as a combinational sum-of-products (i.e., a logical OR function of several logical AND functions). As another example, interconnect resources may be arranged such that specialized processing block 220 can implement an arithmetic sum-of-products (i.e., an addition of several multiplications).

Specialized processing block 220 may also include storage elements such as registers, latches, memory arrays, or other storage circuitry. Such storage elements may serve different purposes. For instance, storage elements may store coefficients for implementing FIR filters or to select and mask input data when implementing a multiplexing function. Alternatively, storage elements may be used to pipeline a critical path or to synchronize data before it is processed. If desired, specialized processing block 220 may be configurable to operate in different modes. For example, specialized processing block 220 may be configurable to operate as an arithmetic circuit, as a multiplexer, and/or a register pipeline.

In certain embodiments, specialized processing block 220 may include a sequencer circuit that provides data for and controls the execution of an arithmetic operation in the specialized processing block. For example, such a sequencer circuit may store the coefficients and the data for a FIR filter implementation and control the FIR filter implementation by controlling the execution of arithmetic operations in the specialized processing block.

In other embodiments, a sequencer circuit may be paired with specialized processing block 220 (e.g., for the purpose of implementing a FIR filter). As an example, the sequencer circuit may be implemented using resources in memory block 260 and versatile processing block 270.

Figure 3:
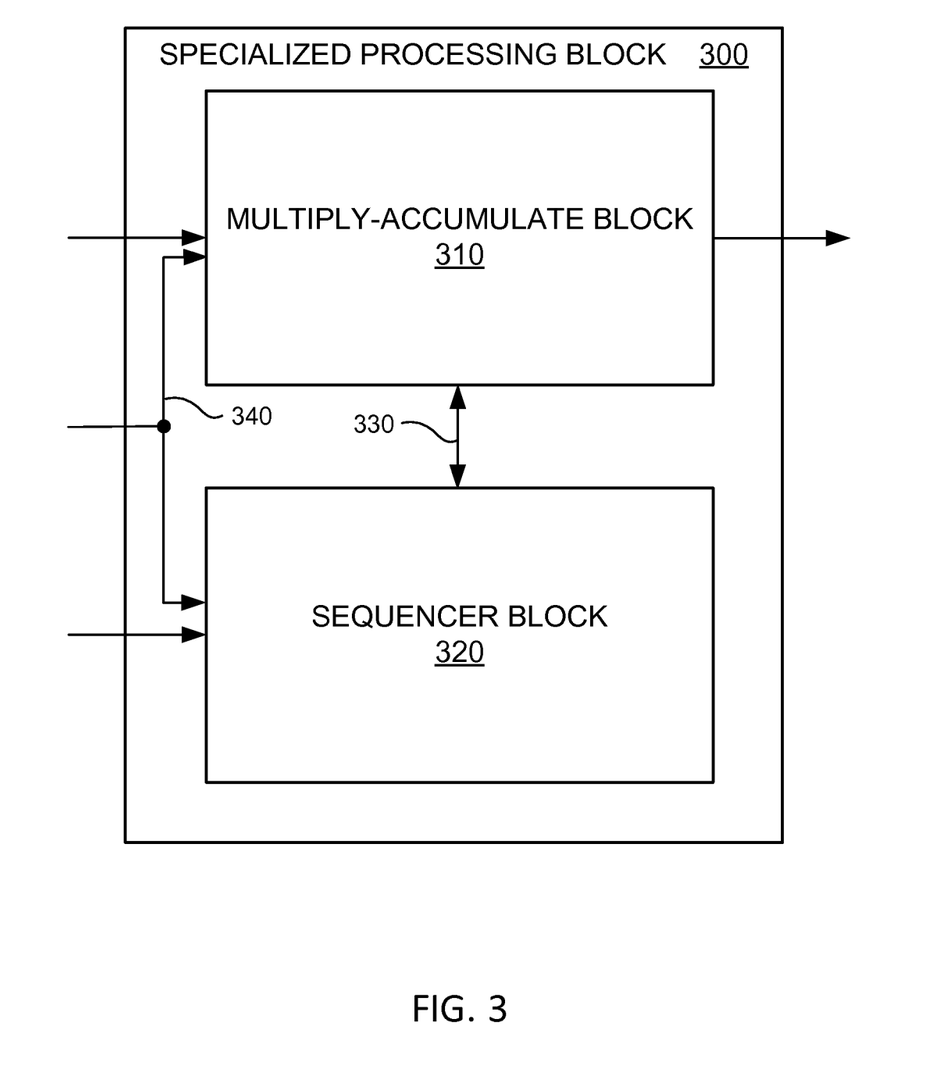
FIG. 3 is a diagram of an illustrative specialized processing block that includes a multiply-accumulate block coupled to a sequencer block in accordance with an embodiment.

FIG. 3 shows an embodiment of a specialized processing block such as specialized processing block 220 of FIG. 2. As shown, specialized processing block 300 may include multiply-accumulate block 310 and sequencer block 320. Specialized processing block 300 may receive input signals at input ports which may be routed to multiply-accumulate block 310 and to sequencer block 320. Multiply-accumulate block 310 may produce output signals based on control and data signals received from sequencer block 320.

If desired, multiply-accumulate block 310 may include arithmetic circuits such as a multiplier, an adder, a subtractor, a counter, an accumulator, etc., storage circuits such as latches, registers, random-access memory (RAM), first-in first-out (FIFO) circuitry, stack or last-in first-out (LIFO) circuitry, read-only memory (ROM), registers, latches, or other storage circuitry suitable to store data, configurable circuitry that configures the multiply-accumulate block 310 to implement a predetermined arithmetic function by routing signals between inputs, outputs, arithmetic circuits, and storage circuits.

Sequencer block 320 may include one or more storage circuits such as latches, registers, random-access memory (RAM), first-in first-out (FIFO) circuitry, stack or last-in first-out (LIFO) circuitry, read-only memory (ROM), registers, latches, or other storage circuitry suitable to store data, arithmetic circuits that perform the computation of address signals to perform memory access operations at the storage circuits. As an example, sequencer block 320 may include counter circuits that perform increment operations by a predetermined number and modulo counter circuits that generate the predetermined number by counting up to a maximum number, etc.

Inputs 340 to the specialized processing block 300 may be shared between multiply-accumulate block 310 and sequencer block 320. If desired, inputs may be routed exclusively from an input of specialized processing block 300 to an input of multiply-accumulate block 310 or to an input of sequencer block 320. Direct connections 330 between multiply-accumulate block 310 and sequencer block 320 may route signals from the input of multiply-accumulate block 310 to sequencer block 320 or from the input of sequencer block 320 to multiply-accumulate block 310. Similarly, signals such as data signals and control signals that are generated by sequencer block 320 may be sent through the direct connections 330 to multiply-accumulate block 310 and signals such as status signals may be sent from multiply-accumulate block 310 to sequencer block 320.

Multiply-accumulate block 310 may produce an output signal and send the output signal to the output of specialized processing block 300. In some embodiments, sequencer block 320 may send data and control signals to additional multiply-accumulate blocks. These control signals may be send from sequencer block 320 through the direct connection 330 to multiply-accumulate block 310 and from there to the output of specialized processing block 300. If desired, sequencer block 320 may send data and control signals directly to an output of specialized processing block 300 (not shown).

Figure 4:
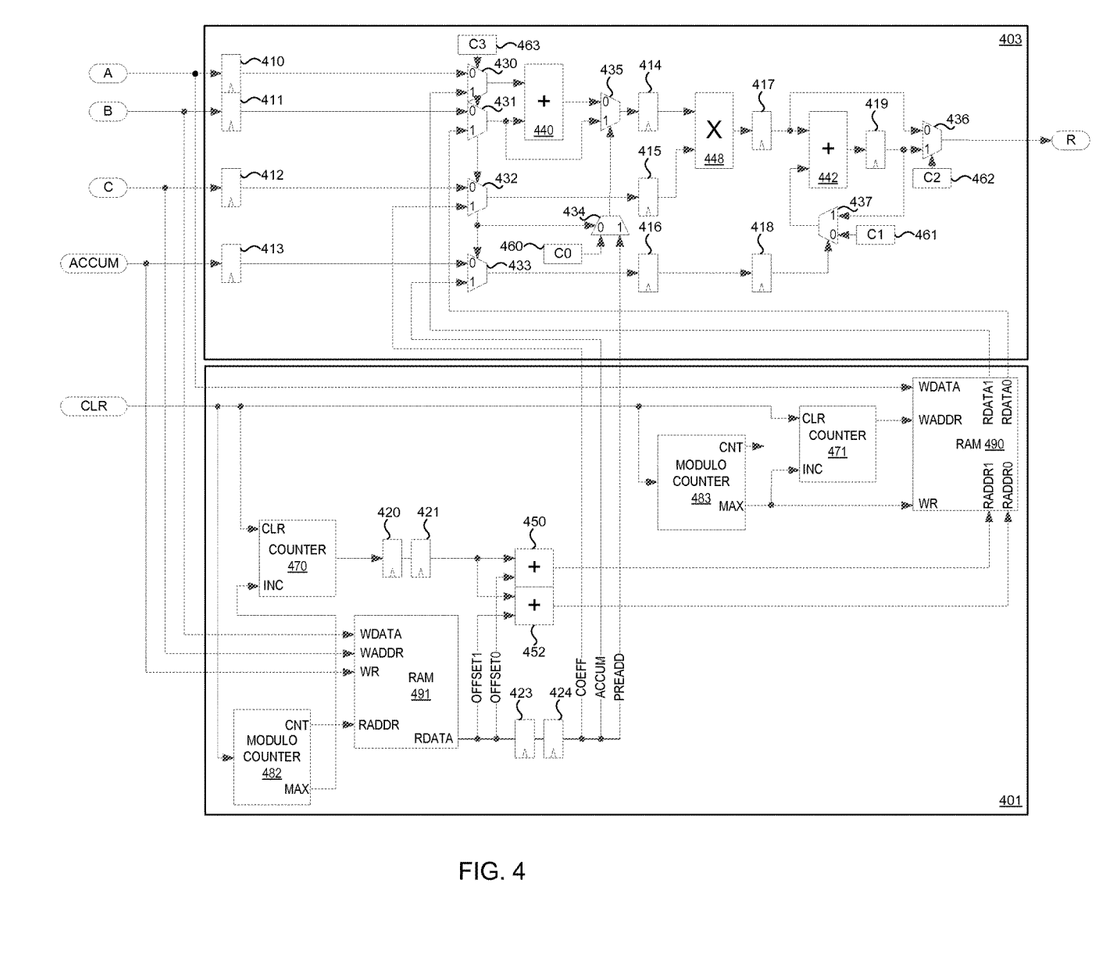
FIG. 4 is a diagram of an illustrative specialized processing block coupled to another embodiment of a sequencer circuit in accordance with an embodiment.

FIG. 4 is a diagram of specialized processing block 403 that is coupled to sequencer circuit 401 in accordance with an embodiment. As shown, specialized processing block 403 may include registers 410-419, multiplexers 430-437, pre-adder 440, adder 442, multiplier 448, and configuration bits 460-463.

As shown, specialized processing block 403 may receive input signals A, B, C, and ACCUM at the inputs, and produce output signal R at the output. The inputs and outputs may be coupled to pre-adder 440, adder 442, and multiplier 448 through configurable circuitry that may implement arithmetic operations by controlling multiplexers 430-437 using configuration bits 460-463, control signal ACCUM from one of the inputs and control signals from sequencer circuit 401. A number of configuration options may exist for specialized processing block 403.

For example, configuration bits C0 (460) and C3 (463) may control whether pre-adder 440 is bypassed, configuration bit C1 (461) may set an initial accumulation value in adder 442, and configuration bit C2 (462) may control whether to bypass the final accumulation stage that includes adder 442 and register 419 in the accumulator loop.

As shown, configuration bit C3 (463) may determine whether specialized processing block 403 operates in arithmetic operator mode based on signals A, B, C, and ACCUM received on the inputs or whether specialized processing block 403 operates in sequencing mode as controlled by sequencer circuit 401 and based on signals received from sequencer circuit 401.

As shown, specialized processing block 403 may implement several functions when operating in arithmetic operator mode. For example, specialized processing block 403 may implement the product of B and C (i.e., R=B*C) by setting configuration bits C2 (462) and C3 (463) to zero and configuration bit C0 (460) to one. As another example, specialized processing block 403 may implement the product of B and C and accumulate the result R based on control bit ACCUM (i.e., R=B*C+(ACCUM ? R: C1)) by setting configuration bit C3 (463) to zero and configuration bits C0 (460) and C2 (462) to one. As another example, specialized processing block 403 may implement the product of C and the sum of A and B (i.e., R=(A+B)*C) by setting configuration bits C0 (460), C2 (462) and C3 (463) to zero. As another example, specialized processing block 403 may implement the product C and the sum of A and B and accumulate the result R based on control bit ACCUM (i.e., R =(A+B)*C+(ACCUM ? R: C1)) by setting configuration bits C0 (460) and C3 (463) to zero and configuration bit C2 (462) to one.

Specialized processing block 403 described in FIG. 4 is merely illustrative and is not intended to limit the scope of the present invention. If desired, some multiplexers may be omitted to trade-off flexibility for circuit area. For example, omitting multiplexers 430, 431, 432, 433, and 434 may reduce the area of specialized processing block 403 by four multiplexers and the respective configuration bits C0 (460) and C3 (463) and wires at the expense that specialized processing block 403 can no longer be controlled by sequencer circuit 401.

If desired, specialized processing block 403 may include additional circuitry. For example, specialized processing block 403 may include additional circuitry for pattern detection, rounding, saturation, overflow and underflow handling, and/or additional arithmetic circuitry such as a chain adder (e.g., an adder that receives a result signal from another specialized processing block and adds this result signal to result R) or additional pre-adder circuitry (e.g., to add B and C), just to name a few. Arithmetic circuitry (i.e., pre-adder 440, multiplier 448, and adder 442) may perform integer arithmetic, fixed-point arithmetic, and/or floating-point arithmetic (e.g., single-precision floating-point, double-precision floating-point, etc.) operations. If desired, specialized processing block 403 may include additional multiplexers that allow bypassing of one or more of registers 410-419.

If desired, specialized processing block 403 may have more or less inputs and outputs. For example, specialized processing block 403 may have only a single output and six inputs. In this example, the single output may be driven by a multiplexer that may choose between an adder output and a multiplier output (not shown).

Every signal in specialized processing block 403 may include multiple bits of data. For example, input signals A, B, and C may all include nine bits, 12 bits, 16 bits, 18 bits, 25 bits, 27 bits, 32 bits, 36 bits, etc. If desired, each pair of signals (i.e., A and B, A and C, or B and C) may have a different number of bits. For example, A may have 18 bits while B and C have 25 bits. As another example, A and B may have 27 bits while C has 18 bits or vice versa. These examples are merely illustrative.

Similarly, if there is an additional output signal as mentioned above, the output signals may have a same number of bits. Alternatively, all output signals may have a different bit width.

Specialized processing block 403 may have a different number of multipliers 448 and/or adders 442 than shown in FIG. 4. For example, specialized processing block 403 may include four multipliers 448 and three adders 442, thereby allowing for four independent multiplications, two independent sum of two products, or a sum of four products.

Multipliers 448 may be any type of multiplier. For example, multiplier 448 may be a floating-point multiplier, a fixed-point multiplier, an integer multiplier, just to name a few. Similarly, adder 442 and pre-adder 440 may be any type of adder. For example, adder 442 and/or pre-adder 440 may be a floating-point adder, a fixed-point adder, an integer adder, just to name a few.

If desired, specialized processing block 403 may have a feedback path (not shown) from the output register 419 that is driven by adder 442 back to the input of multiplier 448 to allow for the implementation of a product-of-sums function.

Sequencer circuit 401 provides data and control signals to specialized processing block 403. Specialized processing block 403 may perform arithmetic operations on the data signals based on the control signals. Sequencer circuit 401 may include storage circuits such as registers 420-424 and random-access memory (RAM) blocks 490 and 491 and arithmetic circuits such as adders 450 and 452, and counters 470, 471, 482 and 483.

Figure 5:
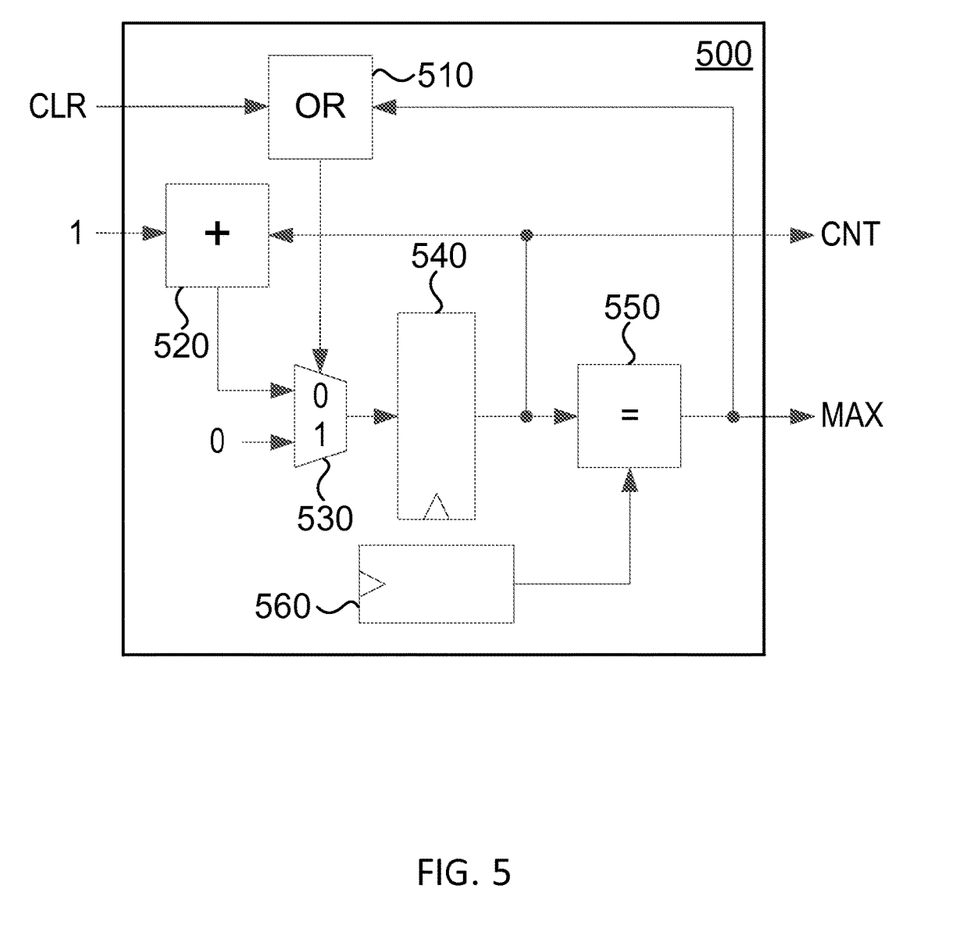
FIG. 5 is a diagram of an illustrative modulo counter circuit in accordance with an embodiment.

If desired, counters 482 and 483 may implement modulo counters. Modulo counters may increment at every trigger event of a clock signal and reset to zero when a maximum value is reached. FIG. 5 shows an illustrative modulo counter 500. As shown, modulo counter 500 may include logic OR gate 510, adder 520, multiplexer 530, comparator 550, and registers 540 and 560. Modulo counter 500 may have two inputs and two outputs. A first input may receive a clear signal CLR while a second input receives the value by which the modulo counter increments (e.g., by one). If desired, this value may be programmed in the modulo counter using an additional register (not shown). In this case, the second input may be omitted.

The first output provides the actual count CNT and a flag MAX indicating whether the maximum value of the counter is reached. The maximum value that the modulo counter may reach before resetting to zero may be stored in register 560. Upon receiving a clear signal CLR that has a value of one, logic OR gate may output a signal of value one, which in turn may set the value of the signal stored in register 540 to zero by selecting the zero at the input of multiplexer 530 at a first trigger event of a clock signal. Consider the scenario in which the maximum value is three and the clear signal CLR is de-asserted and changes its value from one to zero. In this scenario, register 540 may provide a signal with value zero to adder 520, comparator 550, and output CNT.

Comparator 550 may determine that the maximum value stored in register 560 (e.g., three) is different than the value of the signal provided by register 540 (e.g., zero). Thus, the value of the flag signal provided at output MAX may remain at zero. The output of logic OR gate 510 that now receives a clear signal CLR with value zero and a flag signal MAX with value zero may become zero. Adder 520 may add a signal of value one to the signal of value zero from register 540 and store the sum (i.e., a signal of value one) in register 540 at the second trigger event of the clock signal and provide a signal with value one to adder 520, comparator 550, and output CNT.

Comparator 550 may determine that the maximum value stored in register 560 (e.g., three) is different than the value of the signal provided by register 540 (e.g., one). Thus, the value of the flag signal provided at output MAX may remain at zero. The output of logic OR gate 510 that now receives a clear signal CLR with value zero and a flag signal MAX with value zero may remain zero. Adder 520 may add a signal of value one to the signal of value one from register 540 and store the sum (i.e., a signal of value two) in register 540 at the second trigger event of the clock signal and provide a signal with value two to adder 520, comparator 550, and output CNT.

Comparator 550 may determine that the maximum value stored in register 560 (e.g., three) is different than the value of the signal provided by register 540 (e.g., two). Thus, the value of the flag signal provided at output MAX may remain at zero. The output of logic OR gate 510 that now receives a clear signal CLR with value zero and a flag signal MAX with value zero may remain zero. Adder 520 may add a signal of value one to the signal of value two from register 540 and store the sum (i.e., a signal of value three) in register 540 at the third trigger event of the clock signal and provide a signal with value three to adder 520, comparator 550, and output CNT.

Comparator 550 may determine that the maximum value stored in register 560 (e.g., three) is the same as the value of the signal provided by register 540 (e.g., three). Thus, the value of the flag signal provided at output MAX may change from zero to one. The output of logic OR gate 510 that now receives a clear signal CLR with value zero and a flag signal MAX with value one may change from zero to one, which may set the value of the signal stored in register 540 to zero by selecting the zero at the input of multiplexer 530 at a fourth trigger event of a clock signal and provide a signal with value zero to adder 520, comparator 550, and output CNT. While the CLR signal remains de-asserted and the clock signal continues to provide trigger events, modulo counter 500 may repeat the same operations that were described previously by counting from zero to three.

Figure 6:
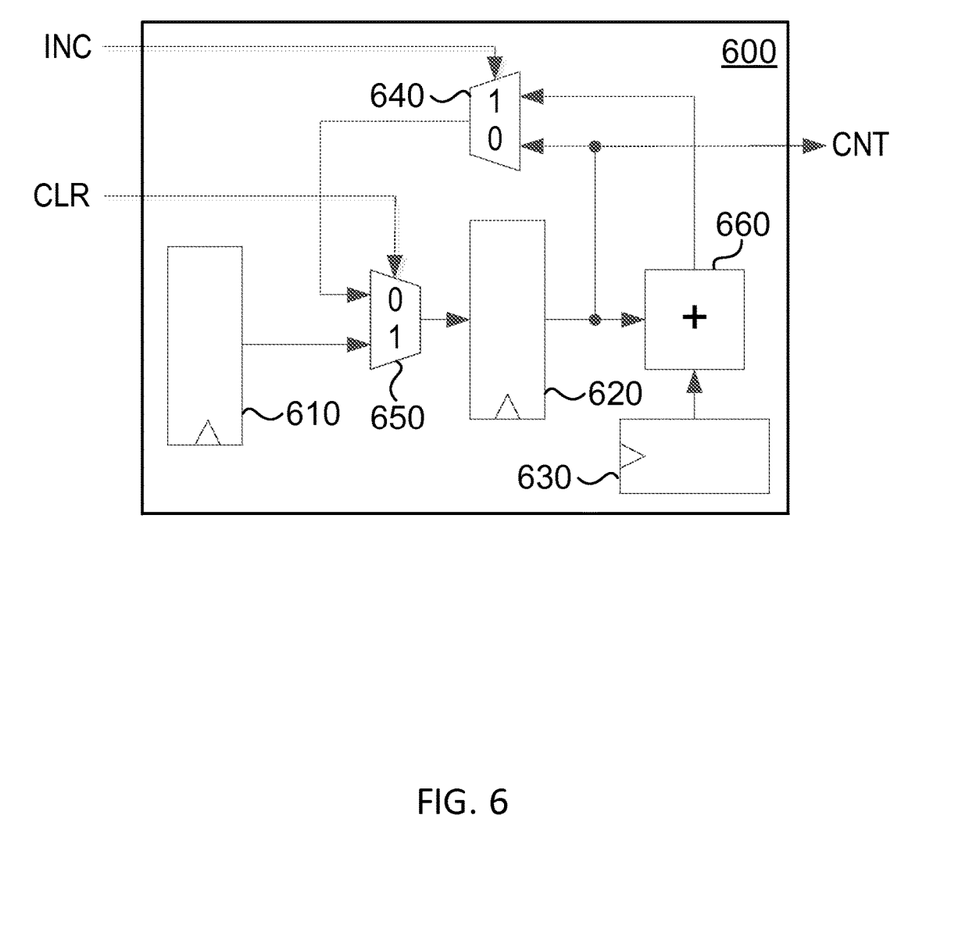
FIG. 6 is a diagram of an illustrative counter circuit in accordance with an embodiment.

Counters 470 and 471 of FIG. 4 may implement full N-bit counters. Counters 470 and 471 may count up by a configured increment in response to the signal received at input INC. If desired, counters 470 and 471 may be configured with an initialization value that is loaded into the counters when the signal at input CLR is activated. The current count provided at output CNT is the sole output from the N-bit counter FIG. 6 illustrates an example of an N-bit counter with adder 660, multiplexers 640 and 650, registers 610, 620, and 630, as well as inputs INC and CLR and output CNT. Register 610 may determine the initialization value that will be loaded into register 620 when the signal at input CLR is asserted (i.e., the signal at input CLR has a value of one). Register 630 may determine the increment applied to the counter every time the signal at input INC is asserted.

As an example, consider the scenario in which registers 610 and 630 store signals of value three and two, respectively. Consider further that the signal at input INC has a value of one before every third triggering event of a clock signal such that register 620 may store the output of adder 660 at the following triggering event. Consider further that the signal at input CLR is asserted at the first triggering event of the clock signal and de-asserted at subsequent triggering events of the clock signal.

In this scenario, register 620 may store a signal of value three at the first triggering event of the clock signal and provide the signal of value three at output CNT, at adder 660, and at the input of register 620 at the first and second triggering events. Adder 660 may compute the sum of the signal of value three from register 620 and the signal of value two stored in register 630 and provide as a result a signal of value five. The signal at input INC may select the output of the adder and provide the signal of value five at the input of register 620, where the signal is stored at the third triggering event.

Register 620 may provide the signal of value five at output CNT, at adder 660, and at the input of register 620 at the fourth and fifth triggering events. Adder 660 may compute the sum of the signal of value five from register 620 and the signal of value two stored in register 630 and provide as a result a signal of value seven. The signal at input INC may select the output of the adder and provide the signal of value seven at the input of register 620, where the signal is stored at the sixth triggering event.

Thus, counter 600 may increment by two every three triggering events of the clock signal, thereby signals of value 9, 11, 13, 15, etc. at output CNT from the $9^{th}$ to the $11^{th}$, from the $12^{th}$ to the $14^{th}$, from the $15^{th}$ to the $17^{th}$, from the $18^{th}$ to the $20^{th}$, etc. triggering events of the clock signal.

Referring back to FIG. 4, the signals provided by counters 470 and 471 may determine the read addresses and the write address for RAM 490. Counters 470 and 471 may implement N-bit counters that are sized to match the widths of the read addresses and the width of the write address of RAM 490, respectively. In other words, if RAM 490 is a 32-bit deep RAM that requires 5-bit read and write addresses then counters 470 and 471 would both be 5-bit counters.

As shown, counter 482 may determine the read address for RAM 491 and may be sized to match the read address requirements of RAM 491. Counter 483 may determine the write flag at input WR of RAM 490.

Figure 7:
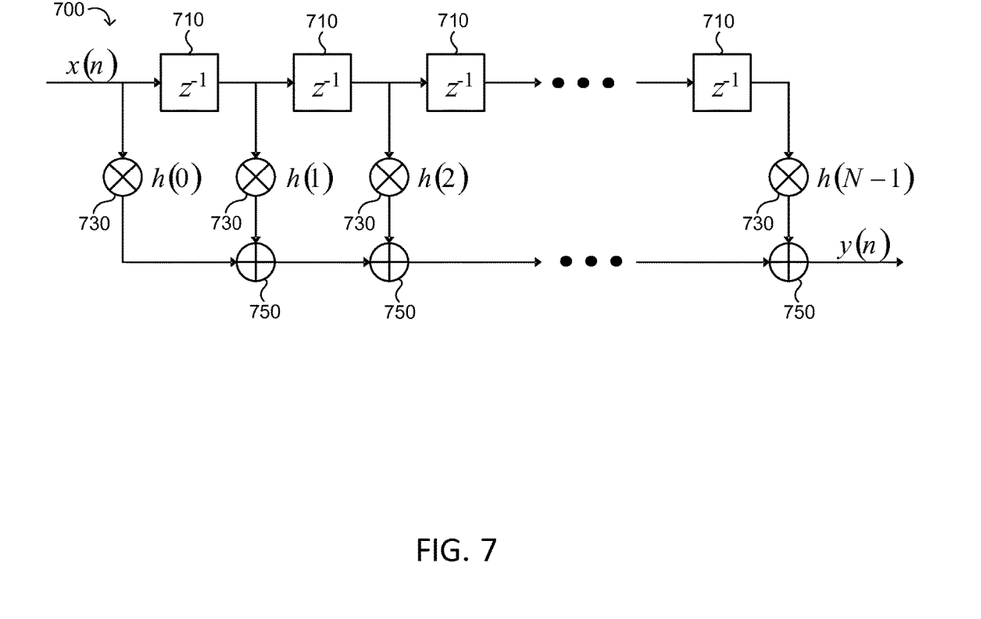
FIG. 7 is a diagram of an illustrative finite impulse response (FIR) filter in accordance with an embodiment.

As mentioned above, finite impulse response (FIR) filters are among the most common types of filters employed in digital signal processing. A diagram of an illustrative finite impulse response (FIR) filter in accordance with an embodiment is shown in FIG. 7.

As shown, FIR filter 700 may include N multipliers 730, (N−1) adders 750, and (N−1) unit delay elements 710. A unit delay element may be any circuit element which allows a signal to be delayed by a number of samples. As an example, a unit delay element may be implemented by a storage element or a pipelining element which may delay a signal by one sample, whereby one sample may be in multiples or fractions of clock periods. Thus, the unit delay element may be a pipelining element such as a buffer, a register, a latch, a shift register, or a first-in first-out (FIFO), just to name a few.

Multipliers 730 receive signals from the FIR filter input and unit delay elements 710, respectively and multiply the signals with coefficients h (0), h (1), h (2), . . . , h (N−1), respectively. Coefficients may be stored in any storage circuit such as registers, RAM circuitry, etc. Adders 750 may receive the respective products and the sum from a previous adder 750 and implement addition operations to produce the sum of all previously computed products. Thus, the transfer function of the FIR filter of FIG. 7 is:

$$y(n)=h(0)*x(n)+h(1)*x(n-1)+ \ldots +h(N-1)*x(n-(N-1)) \quad (1)$$

FIR filter 700 described in FIG. 7 is merely illustrative and is not intended to limit the scope of the present invention. If desired, the FIR filter may vary with the number of taps in the filter (e.g., parameter N in equation (1)). Increasing the number of taps may increase the number of clock cycles that are needed to compute the FIR filter output.

The FIR filter may vary with the decimation rate, which refers to the number of inputs that are consumed for each output of the FIR filter (e.g., the input signal is clocked at 100 megahertz (MHz) and the output signal at 50 MHz). If desired, the decimation rate may include fractional rates, which refers to non-integer decimation rates (e.g., the input signal is clocked at 100 MHz and the output signal at 75 MHz).

The FIR filter may vary with the interpolation rate, which refers to the number of outputs produced for every input consumed by the FIR filter (e.g., the input signal is clocked at 100 MHz and the output signal at 200 MHz). If desired, the interpolation rate may include fractional rates, which refers to non-integer interpolation rates (e.g., the input signal is clocked at 100 MHz and the output signal at 150 MHz).

The FIR filter may vary with the number of channels, which refers to the number of input streams that wish to share the same hardware resources. If desired, multiple channels may be interleaved into a single stream which is then processed by a common FIR filter, thereby ensuring that each FIR computation uses the samples from a single channel.

The FIR filter may include coefficients that are symmetrical. A FIR filter with symmetric coefficients may be implemented more efficiently. For example, if the set of weights specified for a 6-tap FIR filter are {115, 231, 517, 517, 231, 115} then the six multiplies that would be normally required for the FIR computation may be reduced to three by doing a pre-addition before multiplication by a reduced set of weights {115, 231, 517}.

In certain embodiments, sequencer circuit 401 may implement a finite impulse response (FIR) filter together with specialized processing block 403. For example, RAM 490 may provide a write port and two read ports. RAM 490 may store the signal to be filtered (e.g., signal x of equation (1)) by writing the incoming signal values at the write port during a write access operation. RAM 490 may provide the stored signal values at the two read ports during a read access operation. The retrieved signal values from RAM 490 may be sent to specialized processing block 403 over a directly coupled connection between an output of sequencer circuit 401 and specialized processing block 403.

RAM 491 may store the coefficients, control bits, and memory address offsets that are used during the FIR computation. RAM 491 may have a read port, which provides the same signals continuously as the behavior of specialized processing block 403 is primarily determined by the signals read from RAM 491. If desired, RAM 491 may have a write port. As an example, the write port may enable a dynamical update of the signals stored in RAM 491 (e.g., if alternative filter behavior is desired).

In some embodiments, a word retrieved from RAM 491 in a read access operation may include multiple components. For example, the word may include the coefficients of the FIR filter (e.g., signals h (0), h (1), . . . , h (N−1) of FIG. 7). If desired, some of the components of the word may contribute to computing the read addresses of RAM 490 (e.g., signals OFFSET0 and OFFSET1 to determine the address offset to be added to the reference address in determining the read addresses for RAM 490), while other components may control the configurable circuitry of specialized processing block 403 (e.g., signal ACCUM may control if the accumulation loop that includes adder 442 and register 419 is used and signal PREADD may control whether pre-adder 440 is used), thereby controlling the execution of the FIR filter computation in specialized processing block 403.

In certain embodiments, the sequence of memory accesses required for a FIR filter computation may be subdivided into two addresses. Thus, adders 450 and 452 may be used to compute the read addresses for read access operations at RAM 490 by combining the count produced by counter 470 and offsets OFFSET 1 and OFFSET0, respectively. A first address may include a reference address that is updated at the end of each FIR computation and the second address may be an offset that is applied to the reference address to determine the access needed during a particular cycle.

As shown, sequencer circuit 401 may produce two offset values (i.e., OFFSET0 and OFFSET1) and have two adders (e.g., adders 450 and 452), because specialized processing block 403 has pre-adder 440, which is capable of taking in two data values simultaneously. In some embodiments, specialized processing block 403 may be capable of taking in a different number of data inputs simultaneously. Thus, the number of offsets, the number of address adders, and the number of ports of RAM 490 may be changed accordingly. As an example, specialized processing block 403 may have a ternary pre-adder (i.e., a pre-adder which computes the sum of three input signals). In this example, sequencer circuit 401 may produce three offset values and have three adders.

If desired, the inputs of specialized processing block 403 (e.g., signals A, B, C, and ACCUM) may provide inputs to sequencer circuit 401. For example, input A may be used as the input signal of the FIR filter that is coupled to the write data port of RAM 490. As another example, inputs B, C, and ACCUM may be used as the write data signal, the write address signal, and the write enable signal for RAM 491, respectively. If desired, sequencer circuit 401 may include input CLR. The signal received at input CLR may set counters 470, 471, 482, and 483 to a known state.

Sequencer circuit 401 may include registers 420-424 to compensate for the latency through RAM blocks 490 and 491. Consider the scenario in which RAM block 490 and 491 have a two-cycle latency for read operations. In this scenario, registers 420 and 421 may compensate for the read delay through RAM block 491, and registers 423 and 424 may compensate for the read delay through RAM block 490. The number of registers used for latency compensation may vary with the latency of the RAM blocks. For example, in the scenario that RAM block 491 has a three-cycle read latency, three registers would be required between counter 470 and adders 450 and 452 (i.e., registers 420, 421, and an additional register coupled in series).

Specialized processing block 403 and sequencer circuit 401 of FIG. 4 may be configured to implement different types of FIR filters that read signal values (e.g., signals x of equation (1)) from input A and provides a filtered output (e.g., signals y of equation (1)) at output R by configuring counters 470, 471, 482, and 483, and memory 491 appropriately.

As an example, consider a seven-tap, non-symmetric, one-channel FIR filter. Such a FIR filter may require seven multiplications in specialized processing block 403. The seven multiplications may require seven cycles. Thus, counters 482 and 483 may be configured to implement a modulo seven counter that resets to zero after reaching a maximum value of six.

Signals arriving at input A may be sampled and stored in RAM 490 every seven clock cycles, and the reference address contained in counter 470 may be incremented every seven cycles. Both counters 470 and 471 may be configured to increment by one. Counter 471 may be configured with an initial value of seven and counter 470 may be configured with an initial value of zero. This is done so that the FIR computation uses values from the seven slots behind the current value being written into RAM 490.

In this example, the FIR filter is non-symmetric. Thus, pre-adder 440 is not required and signal PREADD remains zero. The accumulator loop of specialized processing block that includes adder 442, register 419, and multiplexer 437 may be turned off for the first clock cycle, but turned on for the subsequent six clock cycles. Thus, RAM 491 may include the values zero, don't care (DC), h (6), zero, and zero for signals OFFSET0, OFFSET1, COEFF, ACCUM, and PREADD at address zero, respectively. The values for signals OFFSET0, OFFSET1, COEFF, ACCUM, and PREADD may be one, DC, h (5), one, and zero, respectively at address one of RAM 491, two, DC, h (4), one, and zero, respectively at address two of RAM 491, three, DC, h (3), one, and zero, respectively at address three of RAM 491, four, DC, h (2), one, and zero, respectively at address four of RAM 491, five, DC, h (1), one, and zero, respectively at address five of RAM 491, and six, DC, h (0), one, and zero, respectively at address six of RAM 491.

As another example, consider a seven-tap, symmetric, two-channel FIR filter. Such a FIR filter may use pre-adder 440 in specialized processing block, thereby reducing the number of multiplications in specialized processing block 403 to four. The four multiplications may require four cycles. Thus, counters 482 and 483 may be configured to implement a modulo four counter that resets to zero after reaching a maximum value of three.

Signals arriving at input A may be sampled and stored in RAM 490 every four clock cycles, and the reference address contained in counter 470 may be incremented every four cycles. Both counters 470 and 471 may be configured to increment by one. Counter 471 may be configured with an initial value of 14 and counter 470 may be configured with an initial value of zero. The initial value of 14 for counter 471 is necessary to accommodate the data signals arriving from two channels and being interleaved in the FIR filter computation.

In this example, the FIR filter is symmetric. Thus, preadder 440 is required and signal PREADD remains one until the last clock cycle during which signal PREADD may be zero, because of the odd number of taps. The accumulator loop of specialized processing block that includes adder 442, register 419, and multiplexer 437 may be turned off for the first clock cycle, but turned on for the subsequent six clock cycles. Both offset signals may be used to reference data that is stored in RAM 490 at addresses with even multiples of two (e.g., to compensate for the interleaving of the two-channel FIR computation).

Thus, RAM 491 may include the values zero, 12, h (0), zero, and one for signals OFFSET0, OFFSET1, COEFF, ACCUM, and PREADD at address zero, respectively. The values for signals OFFSET0, OFFSET1, COEFF, ACCUM, and PREADD may be two, 10, h (1), one, and one, respectively at address one of RAM 491, four, eight, h (2), one, and one, respectively at address two of RAM 491, six, DC, h (3), one, and one, respectively at address three of RAM 491.

As another example, consider a six-tap, non-symmetric, decimate by three, interpolate by two, one-channel FIR filter. A FIR filter that decimates by P may take P inputs at every FIR computation, and a FIR filter that interpolates by Q may produce Q outputs at every FIR computation. In comparison, a non-decimating and non-interpolating filter may take one input and produce one output during every FIR computation.

A non-decimating and non-interpolating six-tap filter may require six multiplications by coefficients h (0), h (1), h (2), h (3), h (4), and h (5). However, a FIR filter that decimates by three and interpolates by two may be subdivided into two filters where the first uses coefficients h (1), h (3), h (5) and the second uses coefficients h (0), h (2), h (4). The entire FIR computation may require six multiplies, that may be split across two separate outputs.

To implement the six-tap, non-symmetric, decimate by three, interpolate by two, one-channel FIR filter, counter 470 may be configured to start at zero and increment by three in order to compensate for the decimation rate which may store three new samples in RAM 490 during each FIR computation. Counter 482 may be configured as a modulo six counter wrapping around after reaching a maximum of five. Counter 471 may be configured to start at five and increment by one. Counter 483 may be configured to be a modulo two counter wrapping around after reaching a maximum of one.

In this example, the FIR filter is non-symmetric. Thus, pre-adder 440 is not required and signal PREADD remains zero. For the same reason, signal OFFSET1 may remain don't care (DC). The accumulator loop of specialized processing block that includes adder 442, register 419, and multiplexer 437 may be turned off for the first and the fourth clock cycle, but turned on for the second, third, fifth, and sixth clock cycles. Thus, a first output may be produced at the end of the third clock cycle, and a second output may be produced at the end of the sixth clock cycle.

Thus, RAM 491 may include the values zero, don't care (DC), h (5), zero, and zero for signals OFFSET0, OFFSET1, COEFF, ACCUM, and PREADD at address zero, respectively. The values for signals OFFSET0, OFFSET1, COEFF, ACCUM, and PREADD may be one, DC, h (3), one, and zero, respectively at address one of RAM 491, two, DC, h (1), one, and zero, respectively at address two of RAM 491, two, DC, h (4), zero, and zero, respectively at address three of RAM 491, three, DC, h (2), one, and zero, respectively at address four of RAM 491, and four, DC, h (0), one, and zero, respectively at address five of RAM 491.

Figure 8:
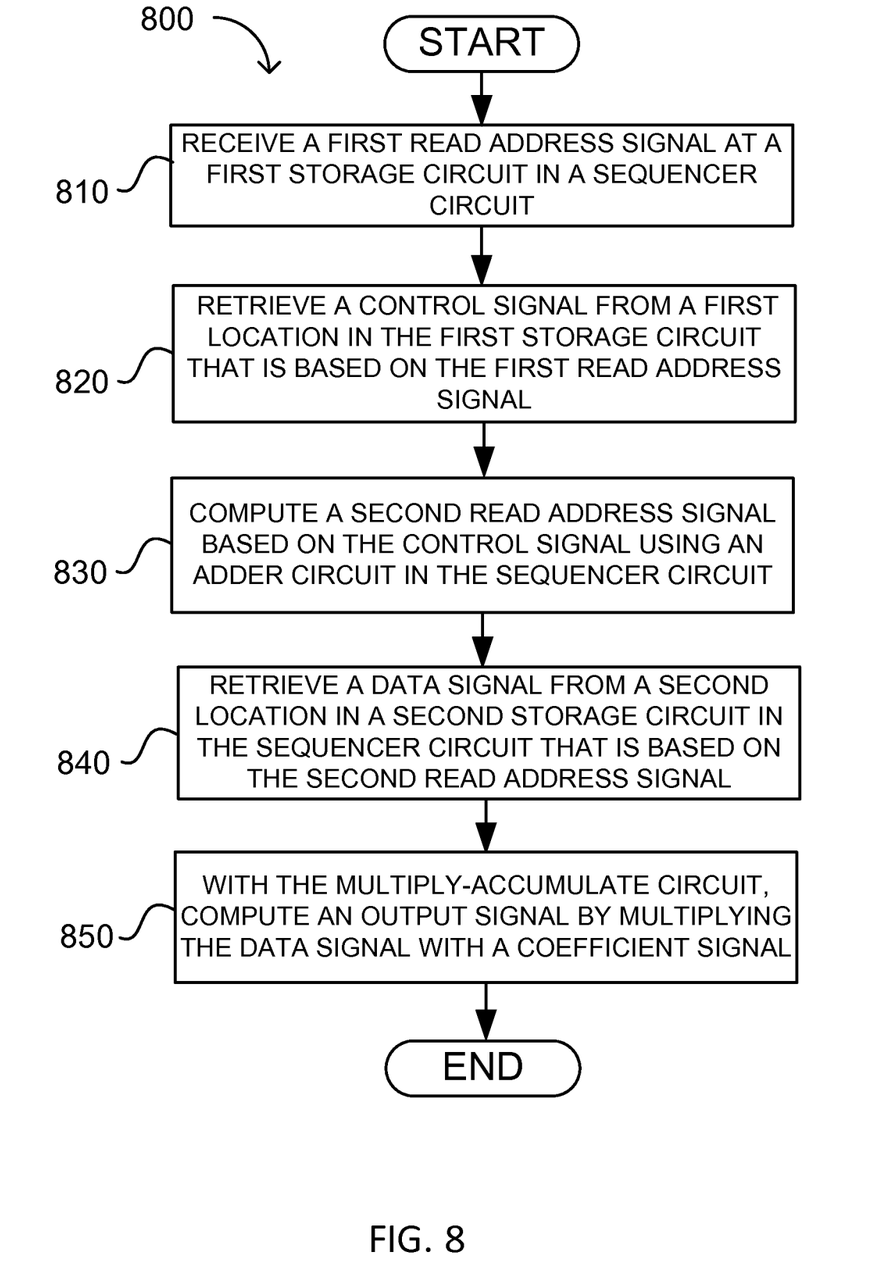
FIG. 8 is a flow chart showing illustrative steps for operating an integrated circuit that includes a multiply-accumulate circuit and a sequencer circuit in accordance with an embodiment.

FIG. 8 is a flow chart showing illustrative steps for operating an integrated circuit that includes a multiply-accumulate circuit and a sequencer circuit such as specialized processing block 300 of FIG. 3 that includes multiply-accumulate block 310 and sequencer block 320 or sequencer circuit 401 and the multiply-accumulate portion of specialized processing block 403 of FIG. 4 in accordance with an embodiment.

During step 810, a first storage circuit in a sequencer circuit may receive a first read address signal. For example, RAM 491 of sequencer circuit 301 of FIG. 4 may receive a read address signal from modulo counter 482.

During step 820, a read access operation may retrieve a control signal from a first location in the first storage circuit that is based on the first address signal. For example, a read access operation may retrieve signals OFFSET0, OFFSET1, ACCUM, COEFF, and PREADD from RAM 491 of FIG. 4.

During step 830, an adder circuit in the sequencer circuit may compute a second read address signal based on the control signal. For example, adder circuit 450 of FIG. 4 may compute a read address signal for RAM 490 based on signal OFFSET0 received from RAM 491.

During step 840, another read access operation may retrieve a data signal from a second location in a second storage circuit in the sequencer circuit that is based on the second read address signal. For example, RAM 490 of sequencer circuit 401 may receive the read address signal from adder 450 and perform another read access operation that retrieves a data signal at a location in RAM 490 that is determined by the read address signal.

During step 850, a multiply-accumulate circuit may compute an output signal by multiplying the data signal with a coefficient signal. For example, the multiply-accumulate portion of specialized processing block 403 of FIG. 4, which may include multiplier 448, adder 442, and register 419 may compute output signal R by using multiplier 448 to multiply the data signal retrieved from RAM 490 with the coefficient signal COEFF retrieved from RAM 491.

The method and apparatus described herein may be incorporated into any suitable electronic device or system of electronic devices. For example, the method and apparatus may be incorporated into numerous types of devices such as microprocessors or other ICs. Exemplary ICs include programmable array logic (PAL), programmable logic arrays (PLAs), field programmable logic arrays (FPGAs), electrically programmable logic devices (EPLDs), electrically erasable programmable logic devices (EEPLDs), logic cell arrays (LCAs), field programmable gate arrays (FPGAs), coarse-grained programmable logic devices (CGPLDs), coarse-grained reconfigurable arrays (CGRAs), application specific standard products (ASSPs), application specific integrated circuits (ASICs), digital signal processors (DSPs), graphics processing units (GPUs) just to name a few.

The integrated circuit described herein may be part of a data processing system that includes one or more of the following components; a processor; memory; I/O circuitry; and peripheral devices. The integrated circuit can be used in a wide variety of applications, such as computer networking, data networking, instrumentation, video processing, digital signal processing, or any suitable other application where the advantage of using a sequencer circuit together with a specialized processing block is desirable.

Although the method operations were described in a specific order, it should be understood that other operations may be performed in between described operations, described operations may be adjusted so that they occur at slightly different times or described operations may be distributed in a system which allows the occurrence of the processing operations at various intervals associated with the processing, as long as the processing of the overlay operations are performed in a desired way.

The foregoing is merely illustrative of the principles of this invention and various modifications can be made by those skilled in the art without departing from the scope and spirit of the invention.

What is claimed is:

1. An arithmetic circuit, comprising:
an output;
a first input coupled to a sequencer circuit that provides a plurality of signals in a predetermined order, wherein the first input receives a first signal of the plurality of signals from the sequencer circuit;
a second input and a third input to receive a second signal of the plurality of signals from the sequencer circuit and a third signal of the plurality of signals from the sequencer circuit;
a multiplier that has a first multiplier input port, a second multiplier input port and a multiplier output port, wherein the multiplier output port is coupled to the output of the arithmetic circuit; and
configuration circuitry that configures the arithmetic circuit to implement a first arithmetic function by routing the first signal and the second signal from the sequencer circuit to the first multiplier input port and the second multiplier input port in a first mode, and that configures the arithmetic circuit to implement a second arithmetic function by routing the second signal and the third signal from the sequencer circuit to the first multiplier input port and the second multiplier input port in a second mode.

2. The arithmetic circuit of claim 1, further comprising:
an adder that has first and second adder input ports and an adder output port, wherein the first adder input port is coupled to the multiplier output port and the adder output port is coupled to the output and to the second adder input port.

3. The arithmetic circuit of claim 2, further comprising:
a register coupled between the adder output port and the second adder input port, wherein the register and the adder collectively implement an accumulate function.

4. The arithmetic circuit of claim 3, further comprising:
a fourth input coupled to the sequencer circuit, wherein the fourth input receives a control signal from the sequencer circuit; and
a multiplexer coupled between the register and the second adder input port, wherein the multiplexer decouples the register from the second adder input port based on the control signal.

5. The arithmetic circuit of claim 1, further comprising:
fourth and fifth inputs coupled to the sequencer circuit, wherein the fourth and fifth inputs receive fourth and fifth signals of the plurality of signals from the sequencer circuit; and
a pre-adder that has first and second pre-adder input ports that receive fourth and fifth signals from the fourth and fifth inputs, respectively, and wherein the pre-adder computes a sum of the fourth and fifth signals.

6. The arithmetic circuit of claim 5, further comprising:
a sixth input coupled to the sequencer circuit, wherein the sixth input receives a control signal from the sequencer circuit; and
a multiplexer that receives the fourth signal from the fourth input, the sum from the pre-adder, and the control signal from the sixth input and that selects between the fourth signal and the sum based on the control signal in the second mode.

7. The arithmetic circuit of claim 1, wherein the sequencer circuit comprises:
a storage circuit that outputs the plurality of signals in the predetermined order.

8. The arithmetic circuit of claim 7, wherein the sequencer circuit further comprises:
a counter circuit that is coupled to the storage circuit and that increments by a predetermined number to generate write addresses for the storage circuit; and
an additional counter circuit that is coupled to the counter circuit and that generates the predetermined number.

9. A sequencer circuit, comprising:
a wire for conveying a clock signal that provides a plurality of trigger events;
a counter to increment by a predetermined number that is greater than one at a first trigger event of the plurality of trigger events to produce a counter output;
a storage circuit to receive a write data signal, a read address signal, and the counter output, wherein, at a second trigger event of the plurality of trigger events, the storage circuit stores the write data signal at a first address that is based on the counter output and outputs a read data signal from a second address that is based on the read address signal; and
an output coupled to an arithmetic circuit, wherein the output is configured to receive the read data signal from the storage circuit and send the read data signal to the arithmetic circuit.

10. The sequencer circuit of claim 9, wherein the counter increments by the predetermined number at a third trigger event in the plurality of trigger events that occurs immediately after the first trigger event.

11. The sequencer circuit of claim 9, further comprising:
a modulo counter circuit coupled to the counter, wherein the modulo counter circuit increments by one up to a maximum number that is greater than one at each trigger event of the plurality of trigger events and provides the maximum number as the predetermined number to the counter.

12. The sequencer circuit of claim 9, further comprising:
an adder that receives first and second signals, computes a sum of the first and second signals, and provides the sum as the read address signal to the storage circuit; and
an additional counter that increments by an additional predetermined number that is greater than one at the first trigger event of the plurality of trigger events to produce an additional counter output and provides the additional counter output as the first signal to the adder.

13. The sequencer circuit of claim 12, further comprising:
an additional storage circuit that receives an additional read address signal and outputs an additional read data signal from a third address that is based on the additional read address signal at the second trigger event of the plurality of trigger events, wherein a first portion of the additional read data signal is provided as the second signal to the adder and wherein a second portion of the additional read data signal is provided as control signals to the arithmetic circuit; and
a modulo counter circuit coupled to the additional counter and the additional storage circuit, wherein the modulo counter circuit increments a count by one up to a maximum number at each trigger event of the plurality of trigger events and provides the maximum number as the additional predetermined number to the additional counter and the count as the additional read address signal to the additional storage circuit.

14. The sequencer circuit of claim 13, wherein the arithmetic circuit further comprises:
a multiply-accumulate circuit that performs a multiply-accumulate function based on the read data signal and the control signals from the sequencer circuit.

15. A method for operating an integrated circuit that includes a multiply-accumulate circuit and a sequencer circuit, comprising:
receiving a first read address signal at a first storage circuit in the sequencer circuit;
retrieving a control signal from a first location in the first storage circuit that is based on the first read address signal;
computing a second read address signal based on the control signal using an adder circuit in the sequencer circuit;
retrieving a data signal from a second location in a second storage circuit in the sequencer circuit that is based on the second read address signal; and
with the multiply-accumulate circuit, computing an output signal by multiplying the data signal with a coefficient signal.

16. The method of claim 15, further comprising:
using a modulo counter circuit to generate an increment signal and a maximum number signal, wherein the first read address signal is based on the increment signal;
using another counter circuit to increment a counter output signal with the maximum number signal; and
sending the counter output signal to the adder circuit.

17. The method of claim 15, further comprising:
using a counter circuit to generate a write address signal; and
sending the write address signal to the second storage circuit.

18. The method of claim 15, further comprising:
retrieving the coefficient signal from the first storage circuit; and
sending the coefficient signal to the multiply-accumulate circuit.

19. The method of claim 18, wherein computing an output signal based on the data signal further comprises:
controlling selector circuits in the multiply-accumulate circuit with the control signals to route the coefficient signal and the data signal to a multiplier in the multiply-accumulate circuit; and
using the multiplier to compute a product of the coefficient signal and the data signal.

20. The method of claim 19, further comprising:
using the multiplier to compute an additional product of an additional coefficient signal and an additional data signal; and
using an accumulator in the multiply-accumulate circuit to compute an accumulation of the product and the additional product as the output signal.

* * * * *